United States Patent
Marking et al.

(10) Patent No.: US 7,846,353 B2
(45) Date of Patent: Dec. 7, 2010

(54) METHOD OF MAKING GREEN-EMITTING BORATE PHOSPHORS

(75) Inventors: Gregory A. Marking, Sayre, PA (US); James E. Murphy, Towanda, PA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 554 days.

(21) Appl. No.: 12/030,374

(22) Filed: Feb. 13, 2008

(65) Prior Publication Data

US 2008/0210904 A1   Sep. 4, 2008

Related U.S. Application Data

(60) Provisional application No. 60/892,326, filed on Mar. 1, 2007.

(51) Int. Cl.
C09K 11/77 (2006.01)
C09K 11/63 (2006.01)
C09K 11/55 (2006.01)

(52) U.S. Cl. ............................................. 252/301.4 R
(58) Field of Classification Search ........... 252/301.4 R
See application file for complete search history.

(56) References Cited

U.S. PATENT DOCUMENTS

| | | | |
|---|---|---|---|
| 4,319,161 A | 3/1982 | Looye et al. |
| 4,719,033 A | 1/1988 | Chenot et al. |
| 5,068,055 A | 11/1991 | Chenot et al. |
| 5,612,590 A | 3/1997 | Trushell et al. |
| 6,007,741 A | 12/1999 | Hunt, Jr. et al. |
| 6,085,971 A | 7/2000 | Tews et al. |
| 6,794,810 B2 | 9/2004 | Gruber et al. |
| 7,138,757 B2 | 11/2006 | Toth et al. |
| 7,221,084 B2 | 5/2007 | Fan et al. |
| 7,259,509 B2 | 8/2007 | Meiss et al. |
| 7,288,215 B2 | 10/2007 | Fan et al. |

OTHER PUBLICATIONS

Lehamnn et al, "Uber die Hydrate des Magnesium(1:3)-borates, MgB6O10 xH20", Z. Anorg. Alig. Chem. 350, pp. 168-176 (1967), article and translation.*
Lehmann et al, "Uber ein wasserhaltiges Magnesiumhexaborat der Formel MgB6O10 x5H20", Z. Anorg. Alig. Chem. 350, pp. 168-176 (1967), article and translation.*
U.S. Appl. No. 12/030,247, filed Feb. 13, 2008.
U.S. Appl. No. 12/030,336, filed Feb. 13, 2008.

* cited by examiner

*Primary Examiner*—C. Melissa Koslow
(74) *Attorney, Agent, or Firm*—Robert F. Clark

(57) ABSTRACT

There is described a method for the preparation of a green-emitting terbium and cerium co-activated gadolinium magnesium pentaborate phosphor that utilizes a hydrated magnesium hexaborate as a boron source. The hydrated magnesium hexaborate preferably may be represented by the formula $MgB_6O_{10} \cdot XH_2O$ where X is from 4 to 6, preferably 4.8 to 5.5, and more preferably about 5. The hydrated magnesium hexaborate is combined with oxides of Gd, Ce, and Tb, and at least one magnesium compound selected from $MgCl_2$, $MgF_2$, and MgO, and then fired in a slightly reducing atmosphere to form the phosphor. The method results in a greater homogeneity of the fired cake and subsequently a higher brightness. In addition, the method preferably requires only one firing step and provides very little or no sticking of the fired cake to the firing boats.

23 Claims, 1 Drawing Sheet

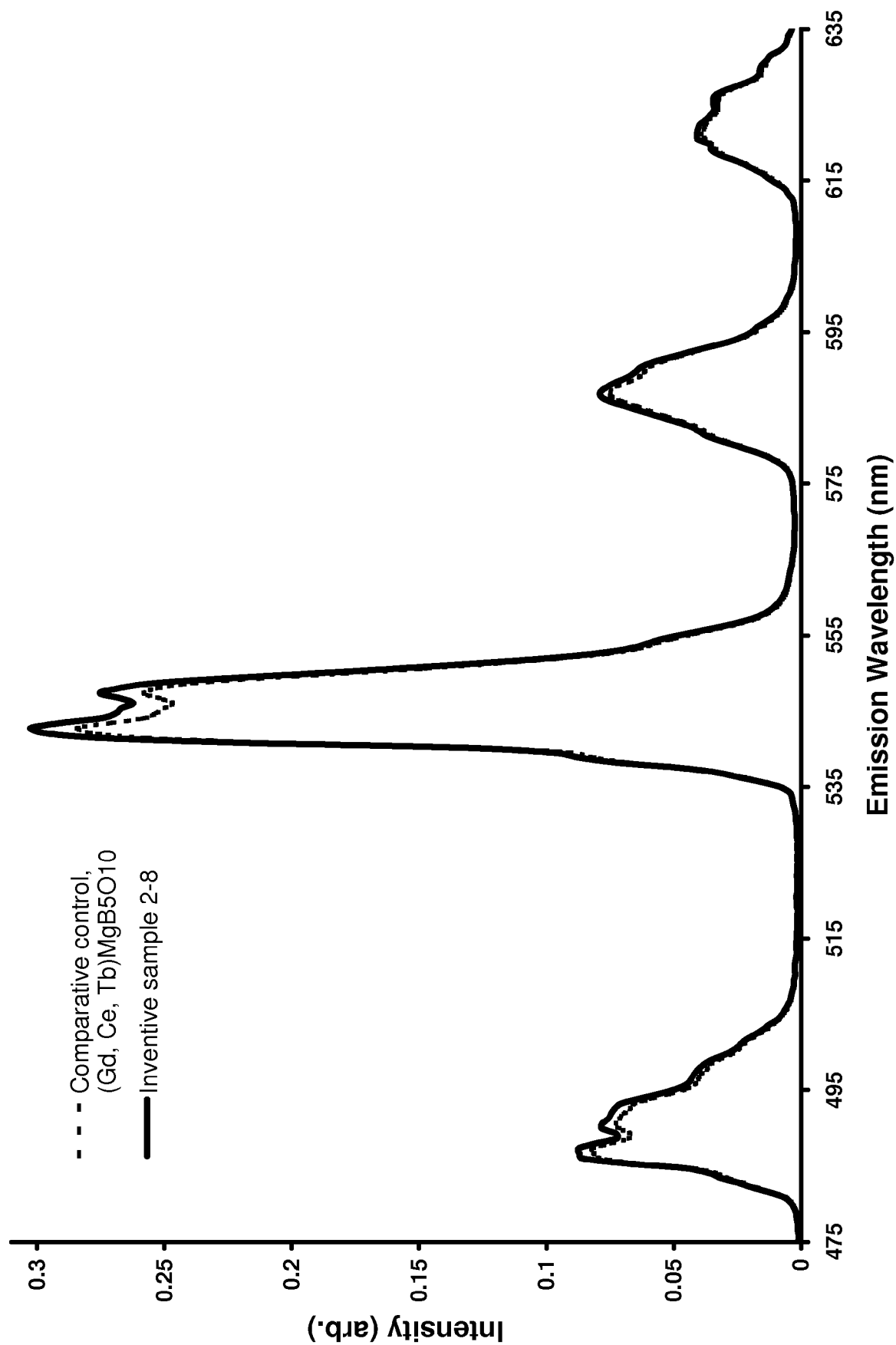

METHOD OF MAKING GREEN-EMITTING BORATE PHOSPHORS

CROSS REFERENCE TO RELATED APPLICATIONS

This application claims the benefit of U.S. Provisional Application No. 60/892,326, filed Mar. 1, 2007, which is incorporated herein by reference.

BACKGROUND OF THE INVENTION

The use of terbium and cerium co-activated green-emitting phosphors in mercury vapor discharge lamps for fluorescent lighting applications is well established. The most commonly used of these phosphors include $LaPO_4$:Ce,Tb, (Ce,Tb)$MgAl_{11}O_{19}$, and (Gd,Ce,Tb)$MgB_5O_{10}$ (referred to herein as CBT). These green-emitting phosphors are typically mixed with a red-emitting phosphor such as $Y_2O_3$:Eu and a blue-emitting phosphor such as $BaMgAl_{10}O_{17}$:Eu or $Sr_5(PO_4)_3$:Cl,Eu to form a blend which emits with an overall white color when excited by the 254 nm radiation generated by the mercury vapor discharge.

U.S. Pat. No. 4,319,161 describes phosphors with the general composition $(Y,La)_{1-x-y-z}Ce_xGd_yTb_z(Mg,Zn)_{1-p}Mn_pB_5O_{10}$. The method of producing these pentaborate phosphors involves dry mixing oxides of the rare earth elements, the oxide or hydrated carbonate-hydroxide of magnesium, manganese carbonate, the oxide of zinc and boric acid, and then subjecting the mixture to two or three firings in a weakly reducing atmosphere. In U.S. Pat. No. 6,085,971, Tews et al. describes that improved brightness, processing, and stability under the influence of short-wave UV radiation may be achieved in luminescent metaborate phosphors of the formula $(Y,La)_{1-x-y-z}Ce_xGd_yTb_z(Mg,Zn,Cd)_{1-p}Mn_pB_{5-q-s}(Al, Ga)_q(X)_sO_{10}$, in which X is Si, Ge, P, Zr, V, Nb, Ta, W, or a combination thereof. Still, the synthesis method involved firing at two temperatures, often with a comminution step in between.

Predictably, methods that require repeated grinding and firing steps are labor intensive which generally means higher manufacturing costs. Furthermore, the use of large quantities of volatile boric acid leads to furnace contamination and generates a significant waste stream.

Unlike the above methods, U.S. Pat. Nos. 4,719,033 and 5,068,055 describe a single-step firing process for making europium-activated strontium tetraborate, $SrB_4O_7$:Eu, a UVA-emitting phosphor. The process involves adding a $SrCO_3/Eu_2O_3$ mixture to an $H_3BO_3$ slurry at >90° C. to form a $(Sr,Eu)B_6O_{10}.5H_2O$ precipitate along with excess $SrCO_3/Eu_2O_3$ in a 2:1 ratio. The precipitate is then fired to yield the $SrB_4O_7$:Eu phosphor. No boric acid is used in the firing step. The hydrated precipitate is fired after drying without adding additional compounds.

Thus, it would be an advantage to have a simpler process for making a CBT phosphor.

SUMMARY OF THE INVENTION

It is an object of this invention to obviate the disadvantages of the prior art.

It is a further object of this invention to provide an improved method of producing a terbium and cerium co-activated gadolinium magnesium pentaborate phosphor.

In accordance with one aspect of the invention, the terbium and cerium co-activated gadolinium magnesium pentaborate phosphor has a composition that preferably may be represented by the general formula $(Gd_{1-x-y}Ce_xTb_y)MgB_5O_{10}$, where x has a value from 0.02 to 0.80 and y has a value from 0.01 to 0.40, and x+y<1. More preferably, x has a value from 0.1 to 0.4 and y has a value from 0.02 to 0.2.

In accordance with another aspect of the invention, the method of this invention involves the use of a hydrated magnesium hexaborate as a boron source, preferably in place of boric acid. The hydrated magnesium hexaborate preferably may be represented by the formula $MgB_6O_{10}.XH_2O$ where X is from 4 to 6, preferably 4.8 to 5.5, and more preferably about 5. The hydrated magnesium hexaborate is combined with oxides of Gd, Ce and Tb, and at least one magnesium compound selected from $MgCl_2$, $MgF_2$, and MgO, and then fired in a slightly reducing atmosphere. Preferably, the mixture is fired at a temperature from about 1020° C. to about 1060° C. in a 99% $N_2$/1% $H_2$ atmosphere to form the pentaborate phosphor. A preferred firing time is from 3 to 4 hours.

In a preferred method, the hydrated magnesium hexaborate is prepared by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour. Preferably, the boric acid solution contains about 6.0 to about 12.0 millimoles of boric acid per 1.0 milliliter of water and about 1.0 to about 2.0 millimoles of magnesium carbonate per 1.0 milliliter water is added. More preferably, the boric acid solution contains about 9.0 to about 10.0 millimoles of boric acid per 1.0 milliliter of water and about 1.5 to about 1.67 millimoles of magnesium carbonate per 1.0 milliliter water is added. The molar ratio of $H_3BO_3$ to $MgCO_3$ used to produce the precipitate is preferably 5.75 to 6.25 and more preferably about 6.0.

BRIEF DESCRIPTION OF THE DRAWING

The FIGURE shows the emission spectra between 475 nm and 635 nm of a standard $(Gd_{0.62},Ce_{0.23},Tb_{0.15})MgB_5O_{10}$ phosphor and inventive phosphor sample 2-8.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The method of this invention uses a hydrated magnesium hexaborate as a boron source in the preparation of terbium and cerium co-activated gadolinium magnesium pentaborate phosphors. The hydrated magnesium hexaborate is preferably prepared as a precipitate which is dried to remove residual liquid water. In general, after drying, hydrated magnesium hexaborate preferably may be represented by the formula $MgB_6O_{10}.XH_2O$ where X is from 4 to 6, preferably 4.8 to 5.5, and more preferably about 5. The number of waters of hydration present in the dried material is dependent upon the drying conditions. In particular, above 200° C., the material starts to lose waters of hydration. The major phase after drying is typically $MgB_6O_{10}.5H_2O$. A typical second phase $MgB_6O_{10}.6H_2O$ tends to change to the pentahydrate form during drying.

The hydrated magnesium hexaborate is combined with oxides of Gd, Ce and Tb, and at least one magnesium compound selected from $MgCl_2$, $MgF_2$, and MgO, and then fired in a slightly reducing atmosphere. This is different from the prior art methods which combine separate oxide powders and magnesium oxide with a large amount of boric acid which can contaminate the furnace. The present method results in a greater homogeneity of the fired cake and subsequently a higher brightness. In addition, the method may be accomplished in one firing step and provides very little or no sticking of the fired cake to the firing boats.

The reported literature syntheses of $MgB_6O_{10}\cdot XH_2O$ (X=5, 6, 7, and 7.5) were directed at the preparation of single crystals for structural determination, although the structure has not been published. See, Lehmann and Rietz, Z. Anorg. Allg. Chem., 350, 168-176 (1967) and Lehmann and Papenfuss, Z. Anorg. Allg. Chem., 301, 228-232 (1959). A typical synthesis included small quantities and lengthy reaction times. For example, 1.5 grams of MgO and 60 grams of $H_3BO_3$ were agitated in 150 ml of $H_2O$ at 80° C. for 15 to 20 days to produce single crystals of $MgB_6O_{10}\cdot 7H_2O$. Neither the small quantities nor the lengthy reaction times are desirable for commercial manufacturing. However, it was determined that by using magnesium carbonate instead of magnesium oxide it was possible to manufacture commercial quantities of $MgB_6O_{10}\cdot XH_2O$.

As used herein, the term "magnesium carbonate" and its general chemical formula "$MgCO_3$" are to be broadly construed to include more complex hydrated carbonate forms such as $Mg_5(CO_3)_4(OH)_2(H_2O)_4$.

In one alternative embodiment, the hydrated magnesium hexaborate is formed by first dissolving about 6.0 to about 12.0 millimoles of boric acid per 1.0 milliliter of de-ionized water. The slurry is agitated and heated to about 90° C. Secondly, about 1.0 to about 2.0 millimoles of magnesium carbonate per 1.0 milliliter of de-ionized water are slowly added into the heated solution and the precipitate is digested for up to 10 minutes at about 90° C. The temperature is then lowered to about 35° C. to about 70° C. and maintained within the lower temperature range for at least about one hour. The molar ratio of $H_3BO_3$ to $MgCO_3$ used to produce the precipitate is preferably 5.75 to 6.25 and more preferably about 6.0. Observation indicates that hydrated magnesium hexaborate has a significant solubility in water. Increasing the concentrations of $H_3BO_3$ and $MgCO_3$ tends to increase the yield of the precipitate. However, when the concentrations are too high, the precipitate becomes overly thick and is difficult to further process. Reducing the final temperature to which the slurry is cooled also increases yield, presumably because the solubility of hydrated magnesium hexaborate decreases as temperature decreases.

The present invention will be described in further detail with reference to the following examples. However, it should be understood that the present invention is by no means restricted to such specific examples.

Example 1

$MgB_6O_{10}\cdot 5H_2O$ Preparation

A $MgB_6O_{10}\cdot 5H_2O$ precipitate was prepared using 20 gallons of de-ionized water, 44.16 kilograms of boric acid, and 10.036 kilograms of $MgCO_3$. The boric acid was added to the water, agitated, and heated to approximately 92° C. before the $MgCO_3$ was slowly added. After the addition was complete, the samples were digested for 10 minutes at approximately 92° C. and then quickly cooled over 1 hour to 36° C. and further cooled to 23° C. for 35 minutes. This material was dewatered in a filter crock overnight and then transferred to glass trays and dried at 250° F. for approximately 24 hours and sifted through a 275 micron screen. The waters of hydration for the dried and sifted material were found to be X=5.16.

The most important differences between precipitation of $MgB_6O_{10}\cdot 5H_2O$ and the $[2(Sr,Eu)B_6O_{10}\cdot 5H_2O+SrCO_3/Eu_2O_3]$ precipitate disclosed in U.S. Pat. Nos. 4,719,033 and 5,068,055 include the reactant concentrations and the digestion temperatures.

$MgB_6O_{10}\cdot 5H_2O$ is preferably prepared by reacting about 9 to about 10 millimoles of $H_3BO_3$/ml $H_2O$ and about 1.5 to about 1.67 millimoles of $MgCO_3$/ml $H_2O$ at about 90° C. and then digesting the precipitate for 3 hours at decreasing temperatures with at least 1 hour of digestion at 50 to 70° C.

The $[2(Sr,Eu)B_6O_{10}\cdot 5H_2O+SrCO_3/Eu_2O_3]$ precipitate is prepared by reacting 7.04 millimoles of $H_3BO_3$/ml $H_2O$ and 1.59 millimoles of $(SrCO_3/Eu_2O_3)$/ml $H_2O$, of which ⅓ is unreacted excess, at about 95° C. and then digesting the precipitate for 6 hours at >85° C.

Observation suggests that $MgB_6O_{10}\cdot 5H_2O$ has a significant solubility in water while $(Sr,Eu)B_6O_{10}\cdot 5H_2O$ has only slight solubility in water. The equipment used to make $MgB_6O_{10}\cdot 5H_2O$ can be cleaned by merely soaking in water. Increasing the concentrations of $H_3BO_3$ and $MgCO_3$ tended to increase the yield of the precipitate, but when the concentrations are too high the precipitate becomes overly thick and is difficult to further process. Reducing the temperature during digestion also increases yield, presumably because the solubility of $MgB_6O_{10}\cdot 5H_2O$ decreases as temperature decreases. Reducing the digestion temperature appears to be more important than increasing the reactant concentrations for improving yield. Another method to increase yield requires the addition of $NH_4OH$ to raise the pH during digestion. This is thought to be unnecessary when the concentrations of reactants are high and the digestion temperature is slowly lowered. A further difference between the two precipitation reactions includes the B/Mg and B/(Sr,Eu) ratios. For $MgB_6O_{10}\cdot 5H_2O$, there is little difference in yield when the B/Mg molar ratio is 7.08:1 or 6.00:1 under similar reaction conditions. This is likely due to the fact that $MgB_6O_{10}\cdot 5H_2O$ is partially water soluble and excess boron does not drive the precipitation to completion. For the $(Sr,Eu)B_6O_{10}\cdot 5H_2O$ precipitation reaction, excess boron does appear to drive the precipitation to completion. Although the reactants are similar to those used for the $[2(Sr,Eu)B_6O_{10}\cdot 5H_2O+SrCO_3/Eu_2O_3]$ precipitation process, higher concentrations and digestion at reduced temperatures are important to increase the yield for this reaction. The reduced digestion temperature has been experimentally determined to have little effect upon yield for $[2(Sr,Eu)B_6O_{10}\cdot 5H_2O+SrCO_3/Eu_2O_3]$ precipitation and is, in fact, detrimental to the finished phosphor properties.

Example 2

$(Gd,Ce,Tb)MgB_5O_{10}$ Green-Emitting Phosphor Synthesis

In Example 2, several $(Gd_{0.62},Ce_{0.23},Tb_{0.15})MgB_5O_{10}$ phosphors were synthesized with different ratios of magnesium halide compounds and the $MgB_6O_{10}\cdot 5H_2O$ precipitate. Except for sample 2-1, which contains both $MgB_6O_{10}\cdot 5H_2O$ and boric acid, $MgB_6O_{10}\cdot 5H_2O$ was used as the boron source rather than boric acid. The comparative control sample, which was double-fired at 1035° C. with a comminution step in between, used boric acid as the boron source and did not contain any magnesium halide compounds. The detailed procedures for preparing the control sample are described in U.S. Pat. No. 4,319,161, which is incorporated herein by reference. To optimize the blend ratio of raw materials, each sample was formulated to contain the following molar ratios: 0.62 moles Gd, 0.23 moles Ce and 0.15 moles Tb (from $Gd_2O_3$, $CeO_2$, and $Tb_4O_7$, respectively), 1.025 moles of Mg (from $MgO+MgCl_2+MgF_2+MgB_6O_{10}\cdot 5H_2O$ compounds) and 5.25 moles B (from $MgB_6O_{10}\cdot 5H_2O+H_3BO_3$ compounds). Table 1 lists the raw materials, their molar ratios, the quantities used for inventive samples 2-1 to 2-8, and the finished phosphor brightness.

The materials were weighed, added to a 500 ml plastic bottle, and then blended on a roll mill and paint shaker. The mixture was then fired in a silica crucible for 3.0 hours at 1035° C. in a slightly reducing 99% $N_2$/1% $H_2$ atmosphere. The fired cake was wet milled with 5 mm YTZ beads for 90 minutes, washed, filtered, dried, and screened through 55 micron mesh to produce the $(Gd_{0.62}Ce_{0.23}Tb_{0.15})MgB_5O_{10}$ phosphor. Phosphor samples were packed into plaques and excited by 254 nm radiation from a mercury arc lamp discharge. The emission of each sample was measured from 475-635 nm and compared to the standard $(Gd_{0.62}Ce_{0.23}Tb_{0.15})MgB_5O_{10}$ phosphor prepared according to U.S. Pat. No. 4,319,161. Emission spectra of sample 2-8 and the comparative control sample are shown in FIG. 1. The data shows that the phosphor brightness improves by increasing the molar concentration of $MgB_6O_{10}\cdot 5H_2O$ and by decreasing the molar concentration of boric acid. The data also shows that the phosphor brightness improves by replacing MgO with $MgCl_2$ and $MgF_2$ compounds.

We claim:

1. A method of producing a green-emitting terbium and cerium co-activated gadolinium magnesium pentaborate phosphor comprising:

(a) combining a hydrated magnesium hexaborate with oxides of Gd, Ce, and Tb, and at least one magnesium compound selected from $MgCl_2$, $MgF_2$ and MgO to form a mixture; and (b) firing the mixture in a slightly reducing atmosphere to form the phosphor.

2. The method of claim 1 wherein the hydrated magnesium hexaborate has a formula $MgB_6O_{10}\cdot XH_2O$, where X is from 4 to 6.

3. The method of claim 2 wherein X is 4.8 to 5.5.

4. The method of claim 2 wherein X is about 5.

5. The method of claim 1 wherein the phosphor has a formula $(Gd_{1-x-y}Ce_xTb_y)MgB_5O_{10}$, where x has a value from 0.02 to 0.80 and y has a value from 0.01 to 0.40, and x+y<1.

6. The method of claim 5 wherein x has a value from 0.1 to 0.4 and y has a value from 0.02 to 0.2.

7. The method of claim 1 wherein the mixture is fired at a temperature from about 1020° C. to about 1060° C. in a 99% $N_2$/1% $H_2$ atmosphere.

8. The method of claim 1 wherein the hydrated magnesium hexaborate is formed by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour.

TABLE 1

Relative Brightness of $(Gd_{0.62}Ce_{0.23}Tb_{0.15})MgB_5O_{10}$ samples

| Sample | Mass of Raw Material, grams | | | | | | | | Rel. Brightness (475-635 nm), % |
|---|---|---|---|---|---|---|---|---|---|
| | $Gd_2O_3$ | $Tb_4O_7$ | $CeO_2$ | $MgCl_2$ | $MgF_2$ | MgO | $H_3BO_3$ | $MgB_6O_{10}\cdot 5H_2O$ | |
| Comparative Control | 33.88 | 8.45 | 11.94 | 0 | 0 | 12.39 | 97.385 | 0 | 100 |
| Mole Ratio | 0.31 | 0.0375 | 0.23 | 0 | 0 | 1.025 | 5.25 | 0 | |
| 2-1 | 33.88 | 8.45 | 11.94 | 0 | 0 | 3.33 | 13.91 | 76.33 | 101.8 |
| Mole Ratio | 0.31 | 0.0375 | 0.23 | 0 | 0 | 0.275 | 0.75 | 0.75 | |
| 2-2 | 33.88 | 8.45 | 11.94 | 0 | 0 | 1.81 | 0 | 89.05 | 102.2 |
| Mole Ratio | 0.31 | 0.0375 | 0.23 | 0 | 0 | 0.15 | 0 | 0.875 | |
| 2-3 | 33.88 | 8.45 | 11.94 | 0 | 0.75 | 1.33 | 0 | 89.05 | 102.6 |
| Mole Ratio | 0.31 | 0.0375 | 0.23 | 0 | 0.04 | 0.11 | 0 | 0.875 | |
| 2-4 | 33.88 | 8.45 | 11.94 | 1.15 | 0 | 1.33 | 0 | 89.05 | 103.1 |
| Mole Ratio | 0.31 | 0.0375 | 0.23 | 0.04 | 0 | 0.11 | 0 | 0.875 | |
| 2-5 | 33.88 | 8.45 | 11.94 | 0 | 1.50 | 0.85 | 0 | 89.05 | 103.3 |
| Mole Ratio | 0.31 | 0.0375 | 0.23 | 0 | 0.08 | 0.07 | 0 | 0.875 | |
| 2-6 | 33.88 | 8.45 | 11.94 | 2.31 | 0 | 0.85 | 0 | 89.05 | 103.4 |
| Mole Ratio | 0.31 | 0.0375 | 0.23 | 0.08 | 0 | 0.07 | 0 | 0.875 | |
| 2-7 | 33.88 | 8.45 | 11.94 | 4.32 | 0 | 0 | 0 | 89.05 | 105.0 |
| Mole Ratio | 0.31 | 0.0375 | 0.23 | 0.15 | 0 | 0 | 0 | 0.875 | |
| 2-8 | 33.88 | 8.45 | 11.94 | 0 | 2.82 | 0 | 0 | 89.05 | 106.9 |
| Mole Ratio | 0.31 | 0.0375 | 0.23 | 0 | 0.15 | 0 | 0 | 0.875 | |

While there have been shown and described what are at present considered to be preferred embodiments of the invention, it will be apparent to those skilled in the art that various changes and modifications can be made herein without departing from the scope of the invention as defined by the appended claims. In particular, although a single-step firing process is preferred, the process may less advantageously include additional firing steps.

9. The method of claim 8 wherein the boric acid solution contains about 6.0 to about 12.0 millimoles of boric acid per 1.0 milliliter of water and about 1.0 to about 2.0 millimoles of magnesium carbonate per 1.0 milliliter water is added.

10. The method of claim 8 wherein the boric acid solution contains about 9.0 to about 10.0 millimoles of boric acid per 1.0 milliliter of water and about 1.5 to about 1.67 millimoles of magnesium carbonate per 1.0 milliliter water is added.

11. The method of claim 9 wherein the molar ratio of $H_3BO_3$ to $MgCO_3$ is 5.75 to 6.25.

12. The method of claim 9 wherein the molar ratio of $H_3BO_3$ to $MgCO_3$ is about 6.0.

13. The method of claim 1 wherein the at least one magnesium compound is selected from $MgCl_2$ and $MgF_2$.

14. A method of producing a green-emitting $(Gd_{1-x-y}Ce_xTb_y)MgB_5O_{10}$ phosphor, wherein x has a value from 0.02 to 0.80 and y has a value from 0.01 to 0.40, and x+y<1, the method comprising:
(a) combining a hydrated magnesium hexaborate with oxides of Gd, Ce, and Tb, and at least one magnesium compound selected from $MgCl_2$, $MgF_2$ and MgO to form a mixture, the hydrated magnesium hexaborate having a formula $MgB_6O_{10} \cdot XH_2O$ where X is from 4 to 6; and
(b) firing the mixture at a temperature from about 1020° C. to about 1060° C. in a slightly reducing atmosphere to form the phosphor.

15. The method of claim 14 wherein x has a value from 0.1 to 0.4 and y has a value from 0.02 to 0.2.

16. The method of claim 14 wherein the hydrated magnesium hexaborate is formed by dissolving boric acid in water to form a boric acid solution, heating the boric acid solution to a temperature of about 90° C., adding magnesium carbonate to the boric acid solution, reducing the temperature of the boric acid solution to within a lower temperature range of from about 35° C. to about 70° C., and maintaining the solution within the lower temperature range for at least about one hour.

17. The method of claim 16 wherein the boric acid solution contains about 6.0 to about 12.0 millimoles of boric acid per 1.0 milliliter of water and about 1.0 to about 2.0 millimoles of magnesium carbonate per 1.0 milliliter water is added.

18. The method of claim 16 wherein the boric acid solution contains about 9.0 to about 10.0 millimoles of boric acid per 1.0 milliliter of water and about 1.5 to about 1.67 millimoles of magnesium carbonate per 1.0 milliliter water is added.

19. The method of claim 17 wherein the molar ratio of $H_3BO_3$ to $MgCO_3$ is 5.75 to 6.25.

20. The method of claim 14 wherein X is 4.8 to 5.5.

21. The method of claim 14 wherein X is about 5.

22. The method of claim 19 wherein X is 4.8 to 5.5.

23. The method of claim 19 wherein X is about 5.

* * * * *